W. C. ZELLE.
CONTROL FOR MOTOR VEHICLES.
APPLICATION FILED OCT. 12, 1914.

1,268,910.

Patented June 11, 1918.
10 SHEETS—SHEET 1.

Witnesses:
Edgar S. Farmer
N. D. Preston

Inventor:
William C. Zelle,
by Cann & James,
his attys.

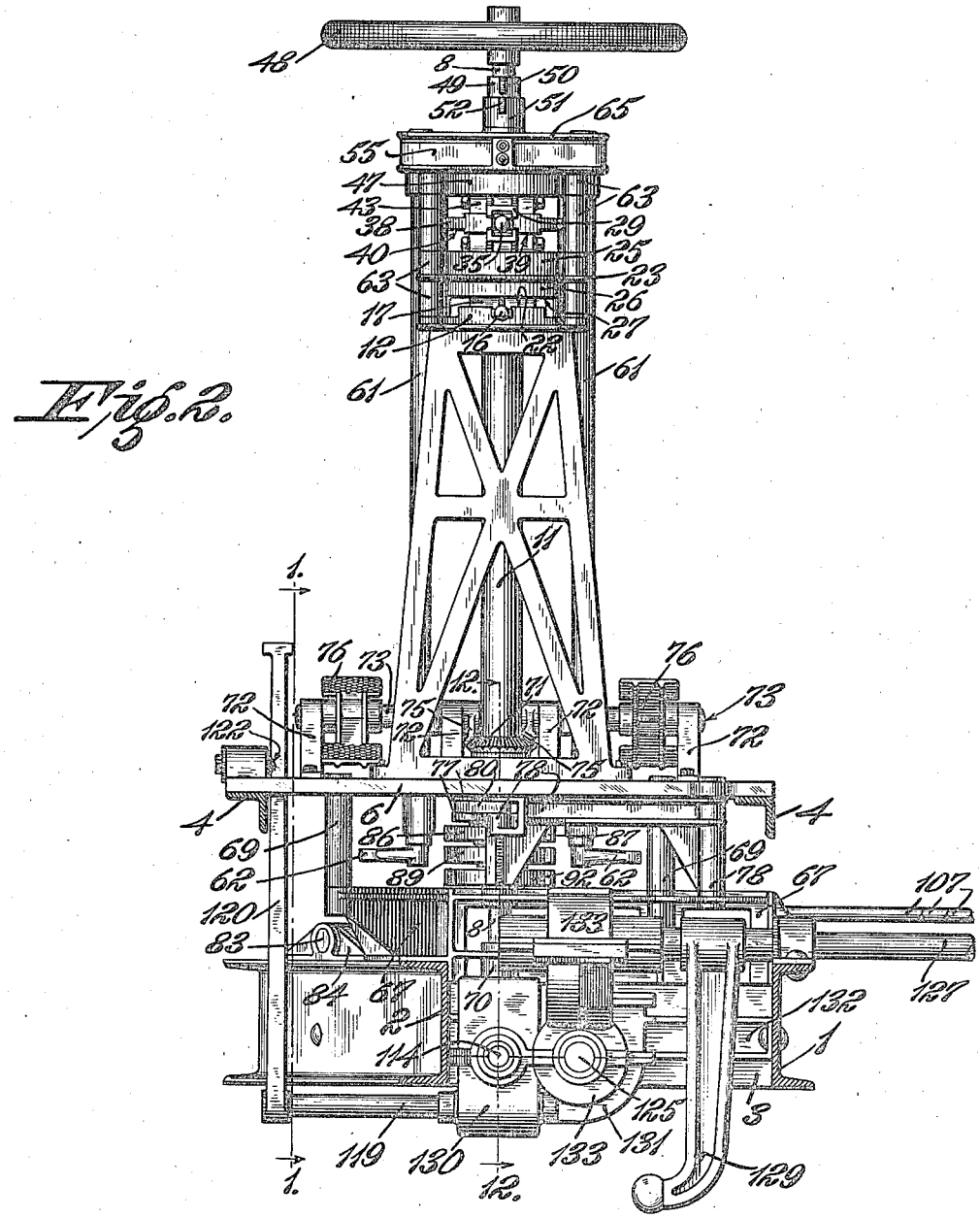

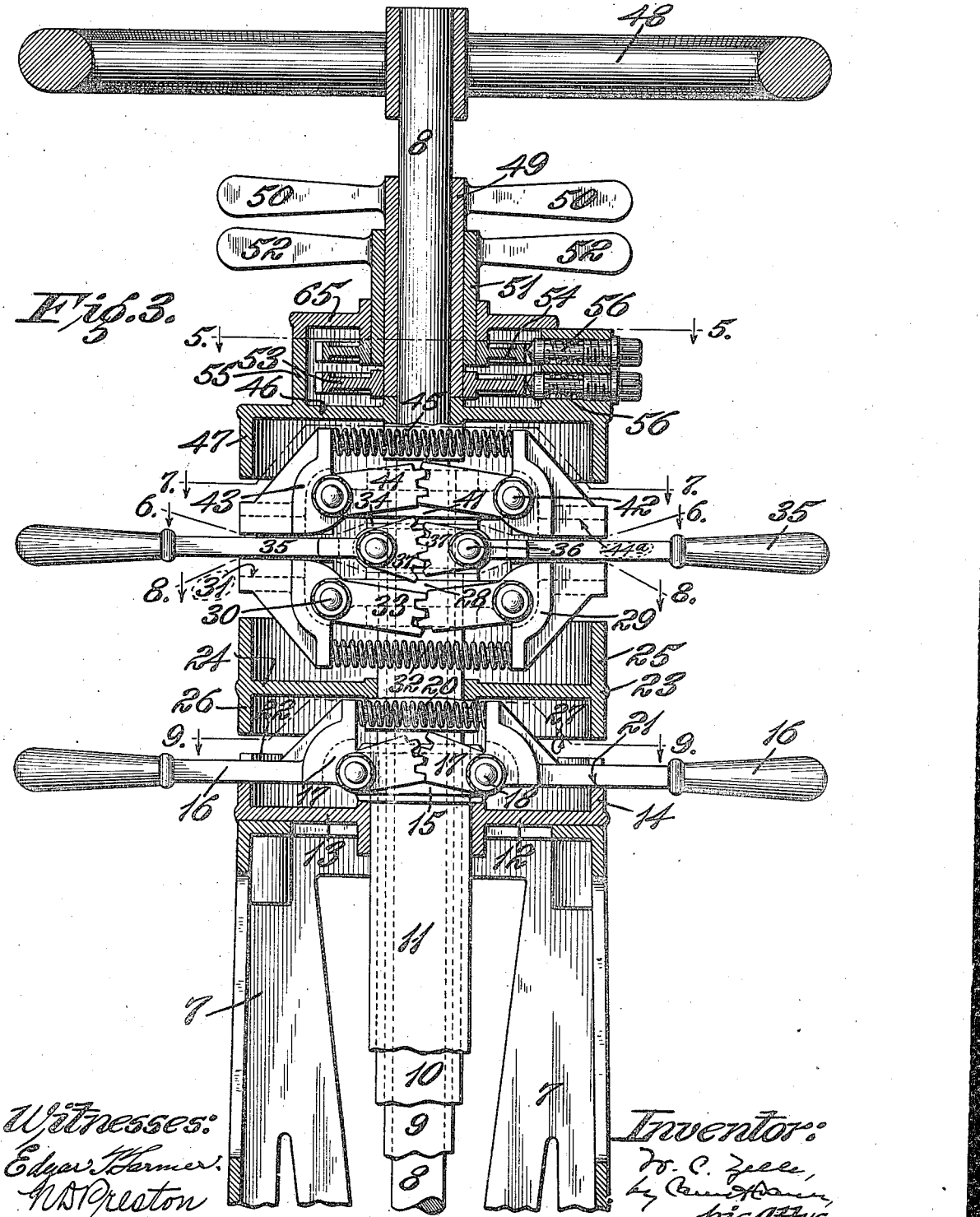

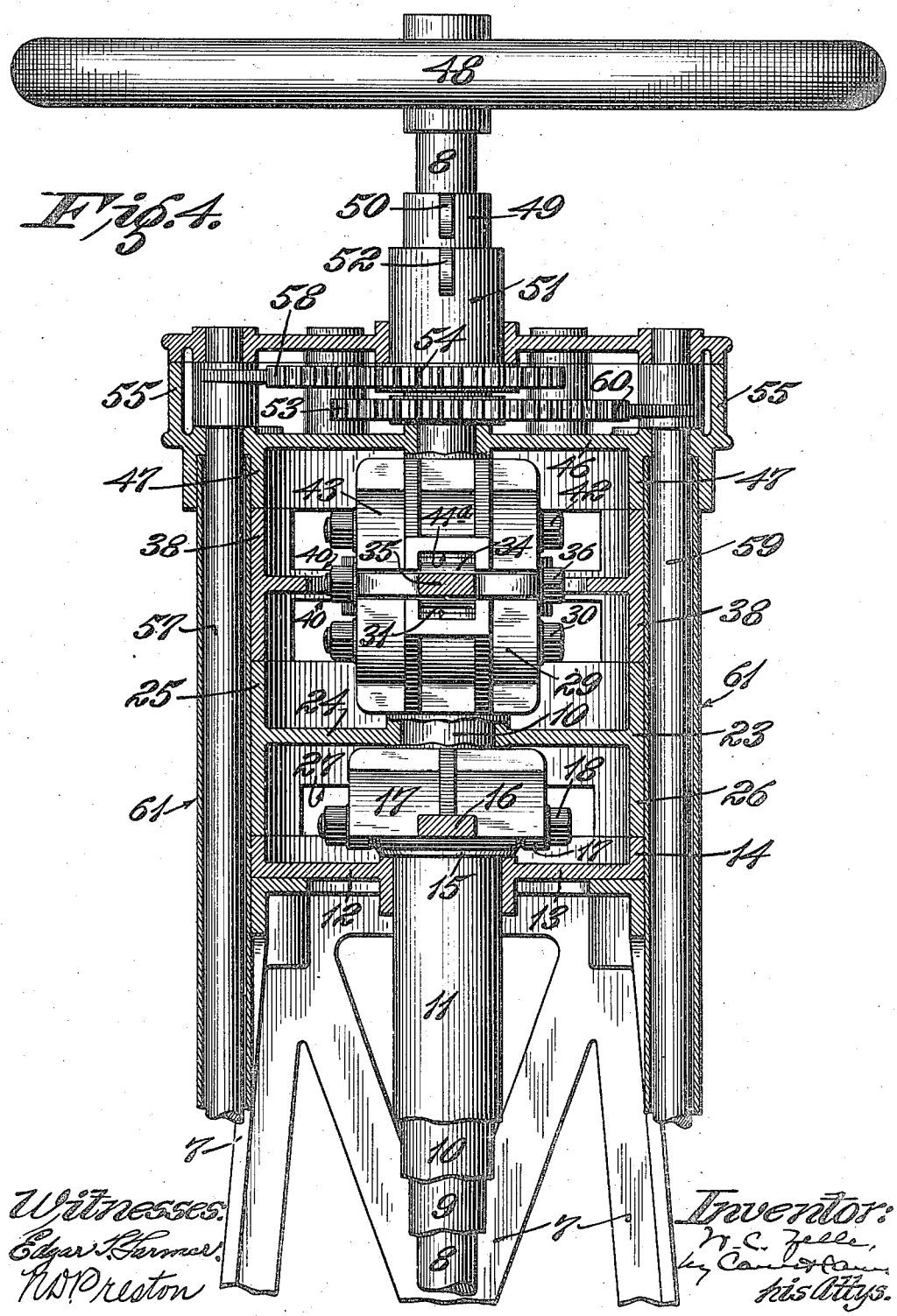

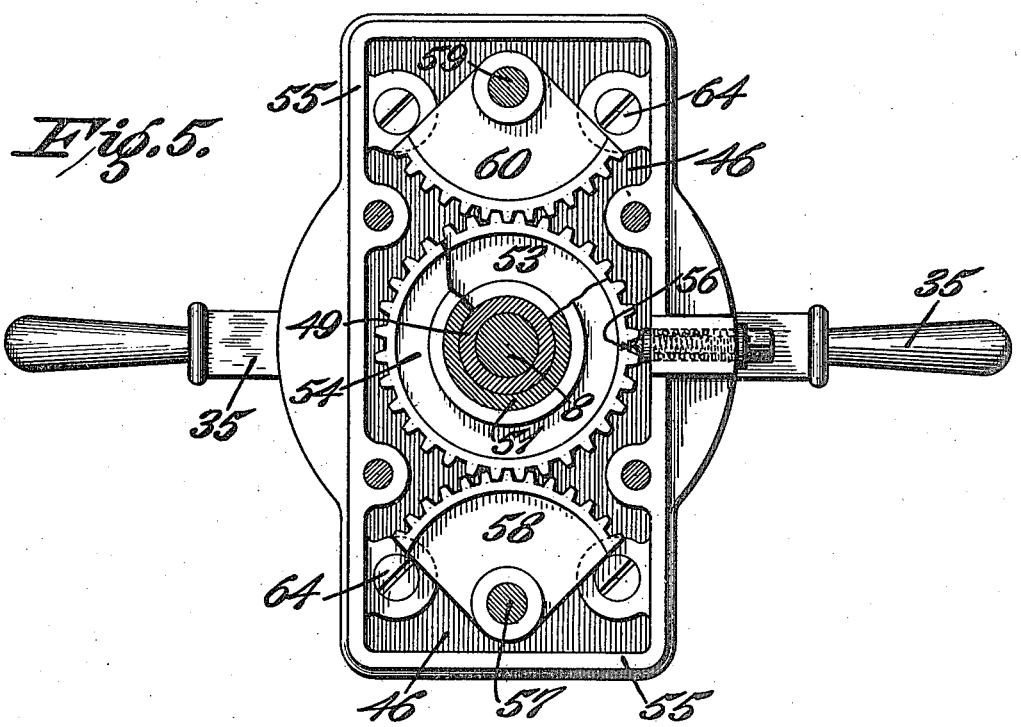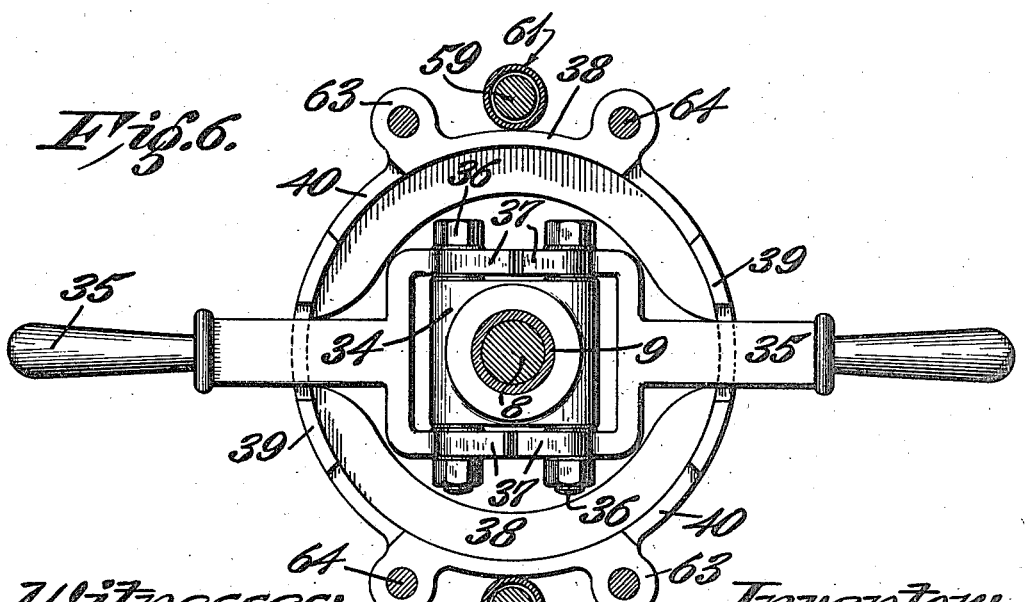

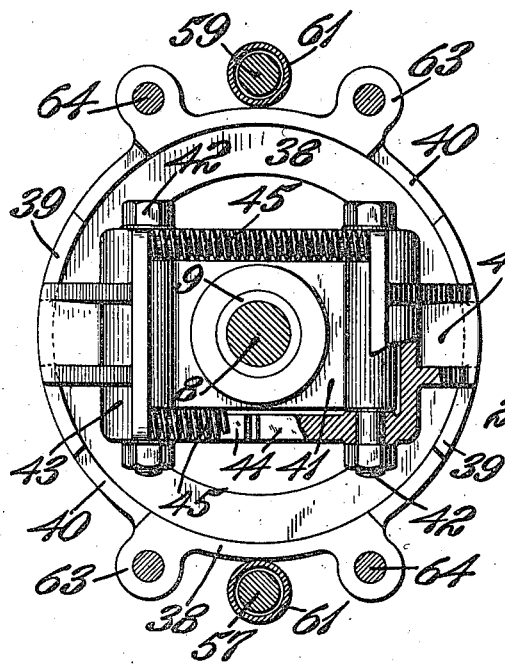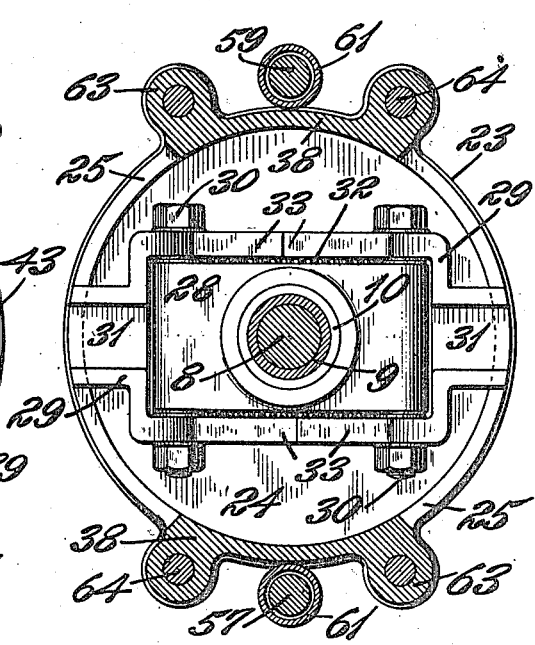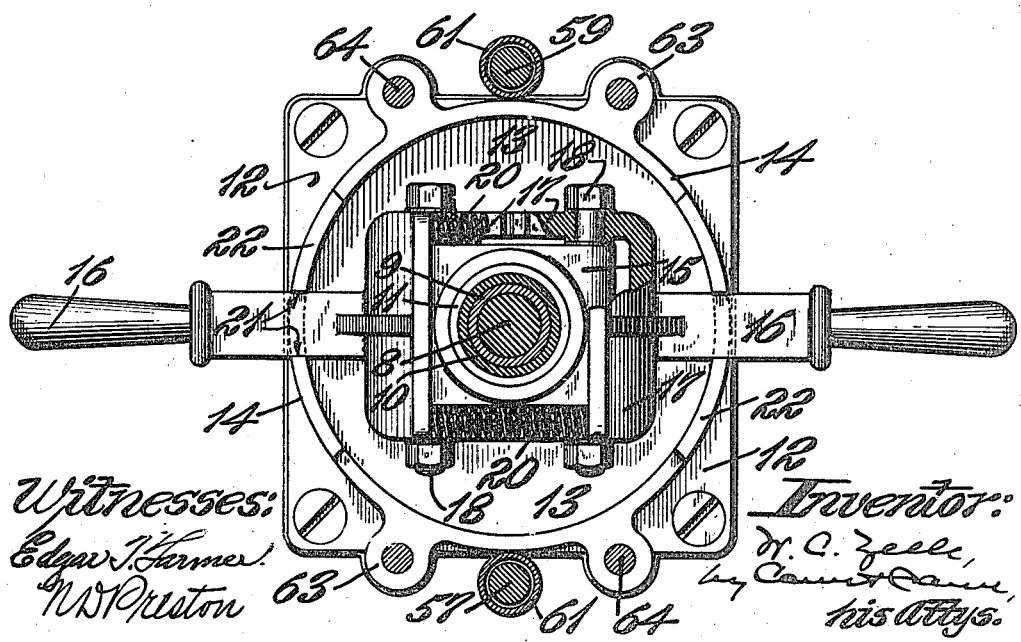

W. C. ZELLE.
CONTROL FOR MOTOR VEHICLES.
APPLICATION FILED OCT. 12, 1914.
1,268,910.
Patented June 11, 1918.
10 SHEETS—SHEET 7.
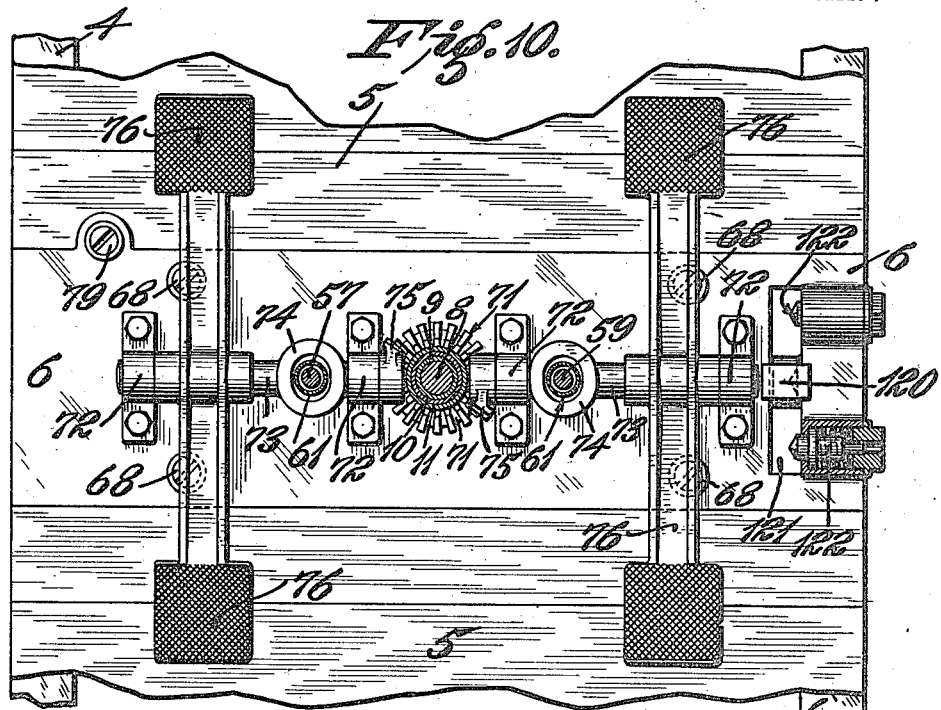

W. C. ZELLE.
CONTROL FOR MOTOR VEHICLES.
APPLICATION FILED OCT. 12, 1914.
1,268,910.
Patented June 11, 1918.
10 SHEETS—SHEET 8.
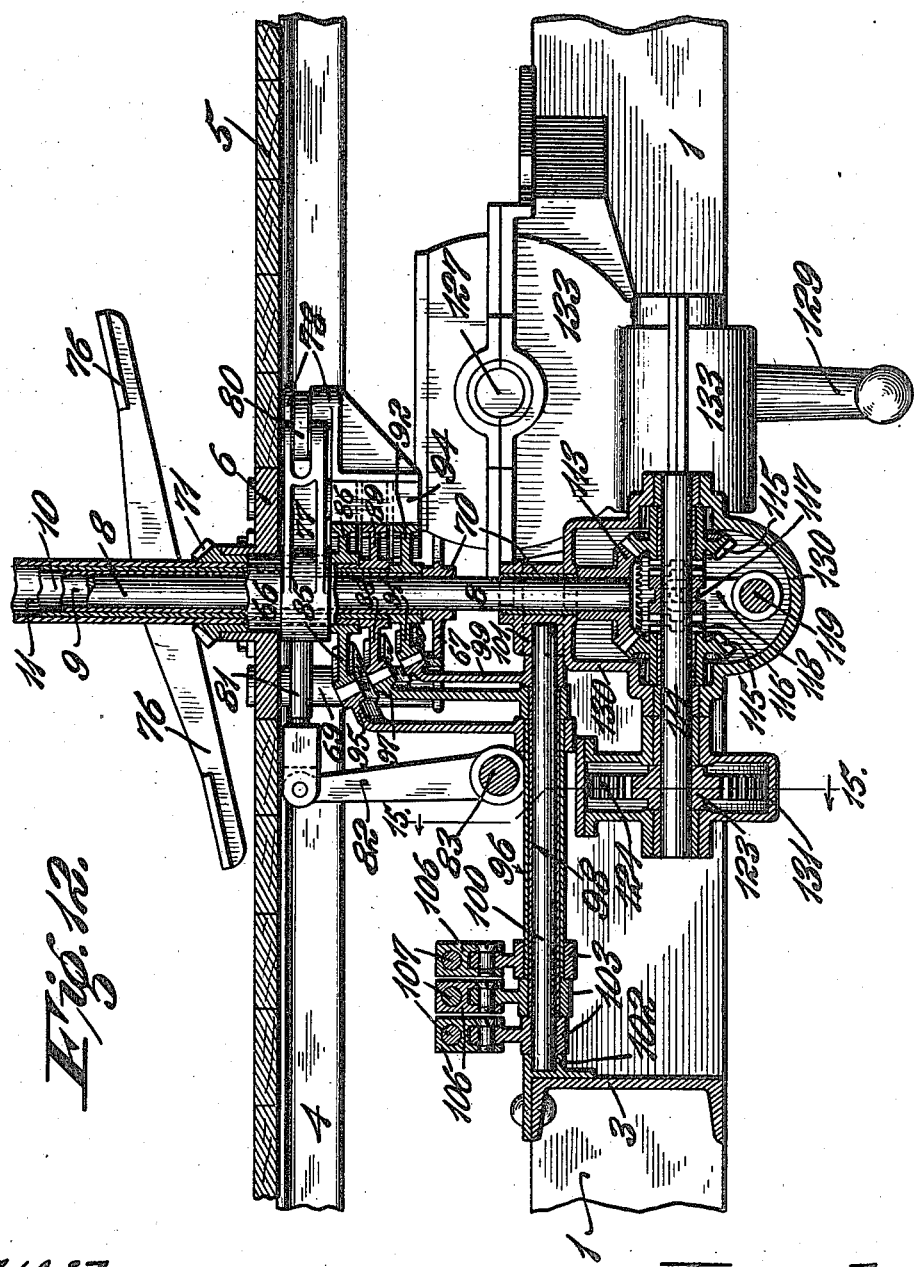

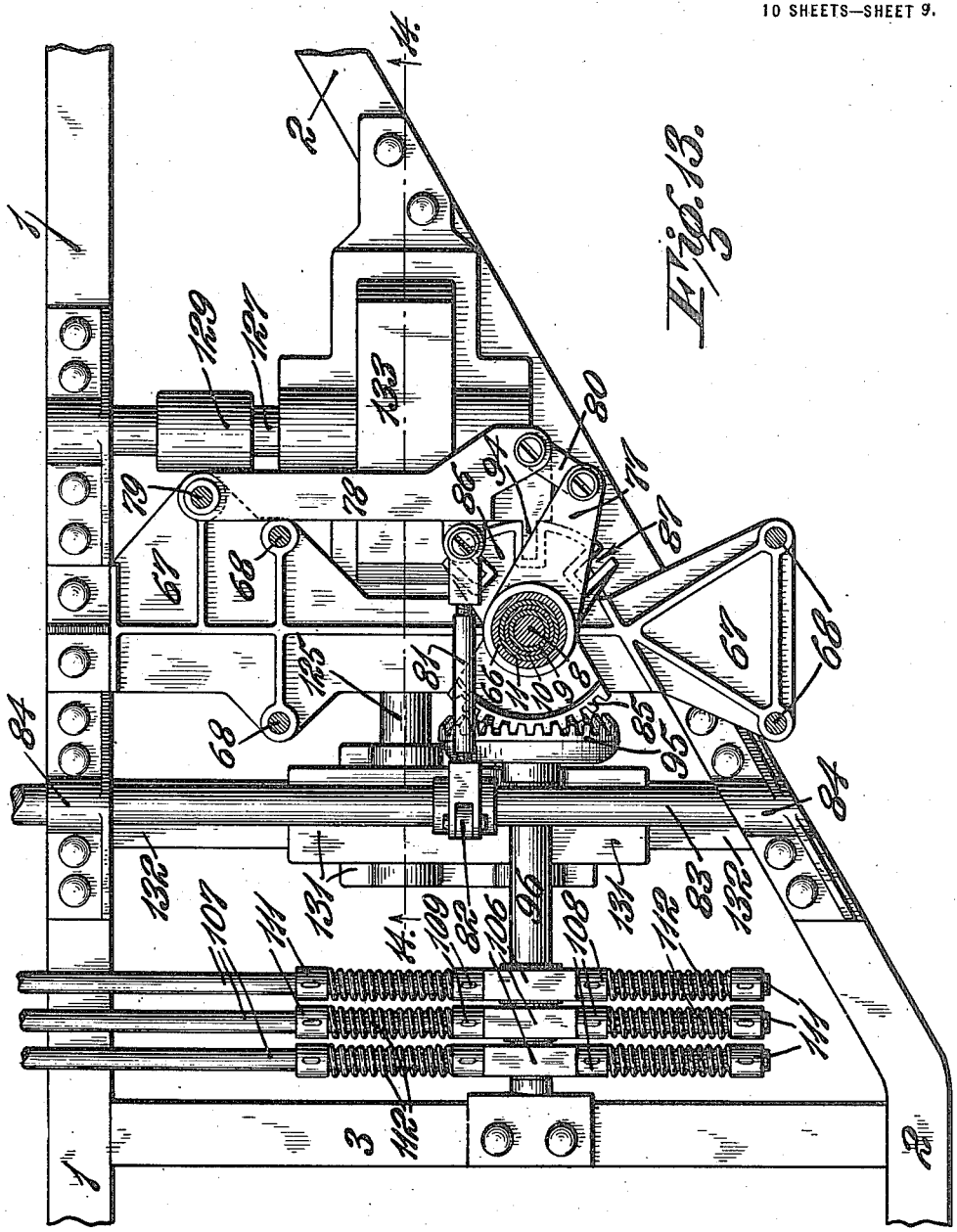

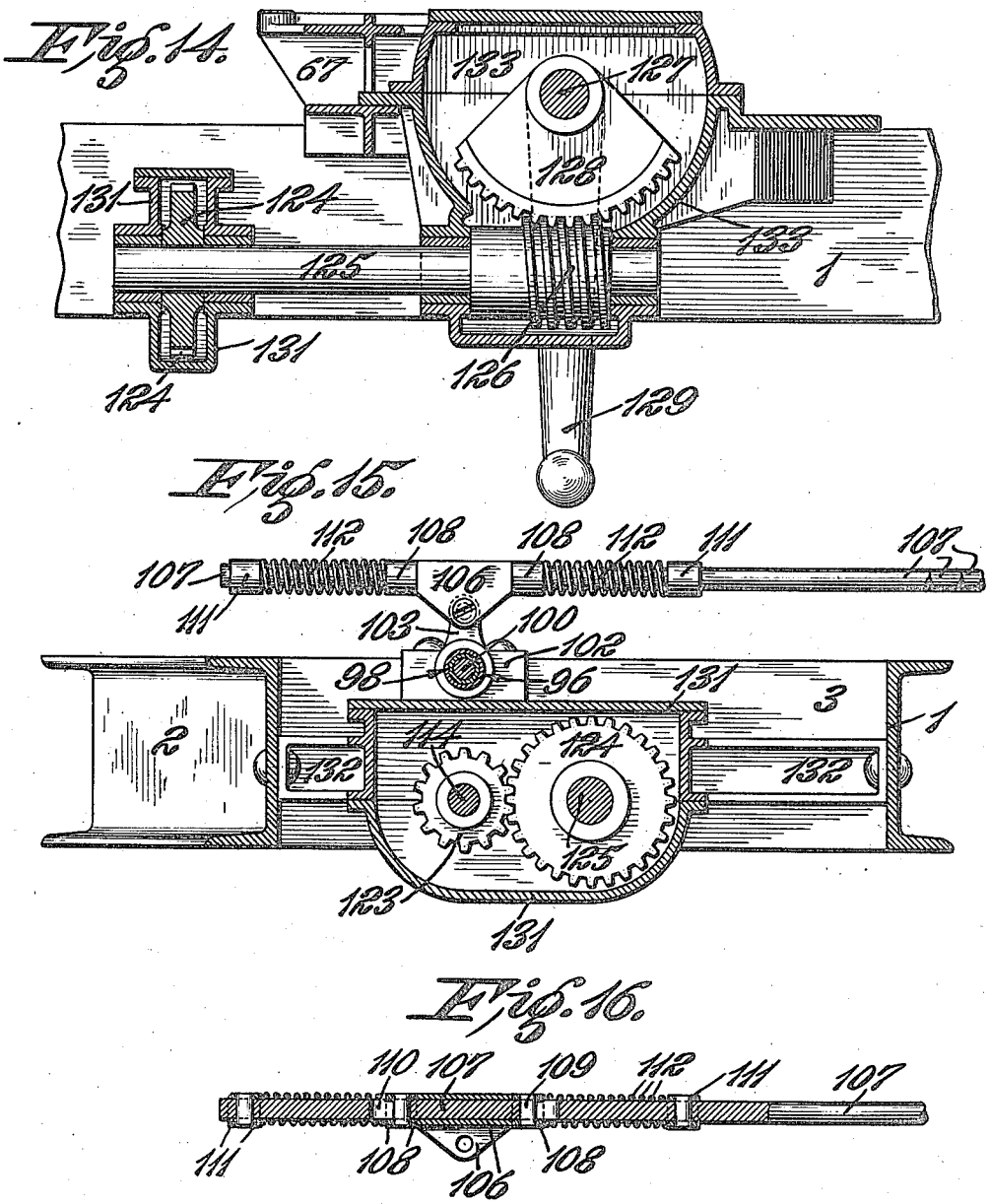

UNITED STATES PATENT OFFICE.

WILLIAM C. ZELLE, OF ST. LOUIS, MISSOURI, ASSIGNOR, BY MESNE ASSIGNMENTS, TO ZELLE TRACTOR COMPANY, OF WILMINGTON, DELAWARE, A CORPORATION OF DELAWARE.

CONTROL FOR MOTOR-VEHICLES.

1,268,910.      Specification of Letters Patent.      Patented June 11, 1918.

Application filed October 12, 1914. Serial No. 866,375.

*To all whom it may concern:*

Be it known that I, WILLIAM C. ZELLE, a citizen of the United States, and a resident of the city of St. Louis and State of Missouri, have invented a new and useful Improvement in Controls for Motor-Vehicles, of which the following is a specification.

My invention relates to devices for controlling the speed and direction of motor vehicles, particularly to such controlling devices for motor vehicles which are driven either forward or backward in service.

One of the principal objects of my invention is to provide a control for a motor vehicle in which the controlling devices for said motor vehicles are grouped together, and in which said controlling devices can be manipulated with the same facility by an operator facing in the direction in which the motor vehicle is driven, whether said motor vehicle is moving forward or backward. A further object is to provide a control of the character above specified which may be manipulated surely and safely by permitting the operator to make the same movements in manipulating the controlling devices whether he is seated in front or back of said control. Further objects are to attain certain advantages which will be more fully set forth hereinafter.

The invention consists in the parts and in the arrangements and combinations of parts, as will more fully appear hereinafter.

In the accompanying drawings, which form part of this specification, and in which like symbols refer to like parts throughout the several views, Figure 1 is a side view of a control for a tractor embodying my invention, said Fig. 1 being a section taken on the line 1—1 on Fig. 2;

Fig. 2 is a front elevation of the control shown in Fig. 1;

Fig. 3 is a vertical section through the upper part of the control, said section being taken in the plane of the hand levers, certain parts being in elevation;

Fig. 4 is a vertical section through the upper part of the control, said section being taken in a plane at right angles to the plane of the hand levers, certain parts being in elevation;

Fig. 5 is a horizontal section on the line 5—5 on Fig. 3;

Fig. 6 is a horizontal section on the line 6—6 on Fig. 3;

Fig. 7 is a horizontal section on the line 7—7 on Fig. 3;

Fig. 8 is a horizontal section on the line 8—8 on Fig. 3;

Fig. 9 is a horizontal section on the line 9—9 on Fig. 3;

Fig. 10 is a plan view of the lower part of the control, the standard being removed;

Fig. 11 is a front elevation of the lower part of the control shown in Fig. 10, with parts in section, and parts removed;

Fig. 12 is an enlarged vertical section of the lower part of the control on the line 12—12 on Fig. 2, with the standard and one of the channels of the body frame of the vehicle removed;

Fig. 13 is an enlarged plan view of the parts of the control below the base plate;

Fig. 14 is a section on the line 14—14 on Fig. 13;

Fig. 15 is a section on the line 15—15 on Fig. 12; and

Fig. 16 is a detail in longitudinal section through one of the rods connected to the change speed and reversing gearing of the motor vehicle.

Figure 1:
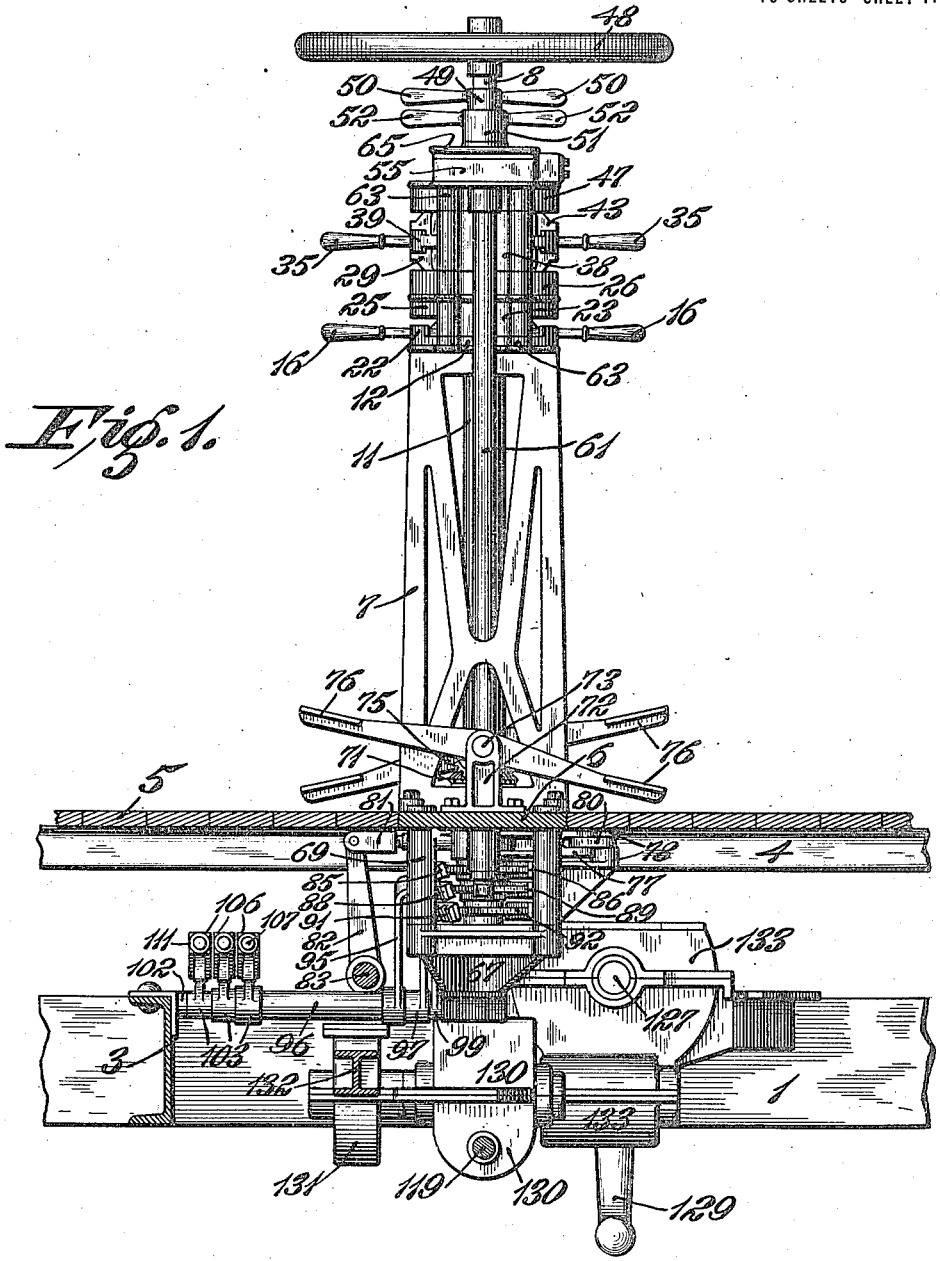

In the control shown in the accompanying drawings, the controlling devices of the motor vehicle are grouped and mounted upon two channels 1 and 2, which constitute part of the body frame or chassis of the motor vehicle and which are arranged at an angle to each other (Fig. 13). Fixed to each of the channels 1 and 2 is a cross channel 3. Located above the channels 1, 2 and 3 are parallel angle irons 4 which are supported upon the body frame of the motor vehicle (in a way not shown) and upon said angle irons 4 is supported the floor 5. Also supported upon the angle irons 4 is a base plate 6. Upon this base plate 6 is secured an upright frame or standard 7. Extending vertically in the standard 7 is a shaft 8 which is surrounded by three concentric hollow shafts or pipes 9, 10 and 11. The shaft 8 fits closely in the smallest pipe 9, but loosely, so that the shaft 8 and said smallest pipe 9 can turn relatively. The smallest pipe 9 likewise fits loosely in the next sized pipe 10, which in turn fits loosely in the largest pipe 11. Secured to the top of the standard 7 is a casing composed of superposed sections.

The lower section 12 of said casing comprises a disk 13 which has an integral flange 14 extending upwardly around the edge of said disk. The largest pipe 11 extends through a flanged opening in the disk 13 for a short distance above said disk 13, and to said projecting end portion of the largest pipe 11 is fixed a rectangular block 15. Straddling the block 15 at each end is the bifurcated end of a hand lever 16. For convenience in description the hand levers 16 will be hereinafter termed "reversing levers." Each branch 17 of the bifurcated ends of each reversing lever 16 is pivoted to the block 15 by a bolt 18 which extends transversely of said block 15 near one end. Each branch 17 of each reversing lever 16 has a number of gear teeth thereon, and the gear teeth of the corresponding branches 17 mesh. Disposed above the bolts 18 and near each longitudinal edge of the block 15 is a compression coiled spring 20, the ends of which engage the reversing levers 16 and tend to move the handles of said reversing levers downwardly. In the upper edge of the flange 14 of the lower section 12 are two notches 21 located diametrically opposite to each other. The notches 21 are about as wide as the reversing levers 16 so that said reversing levers may drop into said notches. Located on each side of each notch 21 is a shoulder 22 in the flange 14 of the lower section 12.

Above the lower section 12 of the casing secured to the top of the standard 7 is a lower intermediate section 23 which comprises a disk 24 having along its edge an upwardly projecting flange 25 and a downwardly projecting flange 26. In the downwardly projecting flange 26 of said disk 24 are long notches 27 which are located diametrically opposite to each other. Each of said long notches 27 is located above one of the notches 21 in the lower section 12 and extends beyond each shoulder 22 of the lower section 12 for a distance about equal to the width of the reversing levers 16. The portions of the downwardly projecting flange 26 of the lower intermediate section 23 between the long notches 27 rest upon the portions of the flange 14 of the lower section 12 between the shoulders 22.

The pipe or hollow shaft 10 extends through a flanged opening in the disk 24 of the lower intermediate section 23 for a short distance above said disk 24, and fixed to the projecting end portion of said pipe 10 is a rectangular block 28. Straddling the block 28 at each end is the bifurcated end of a pivoted member or dog 29. The bifurcated ends of the dogs 29 are pivoted to the block 28 by bolts 30 extending transversly of said block near each end thereof. In the upper face of the outer end portion of each dog 29 is a longitudinal groove 31. Disposed below the bolts 30 and near each longitudinal edge of the block 28 is a compression coiled spring 32, the ends of which engage the dogs 29 and tend to move the outer end portions of said dogs upwardly. Each branch 33 of the bifurcated ends of the dogs 29 has a number of gear teeth thereon; and the gear teeth on the ends of the corresponding branches mesh.

The smallest pipe 9 extends above the block 28 and through another rectangular block 34 which is loose upon the pipe 9 so as to freely rotate thereon. Straddling the block 34 at each end thereof is the bifurcated end of a hand lever 35. For convenience in description the hand levers 35 will be hereinafter termed "speed changing levers." Each branch 37 of the bifurcated end of each speed changing lever 35 is pivoted to the block 34 by a bolt 36 passing transveresly of said block 34 near one end thereof. Each branch 37 of the bifurcated ends of the speed changing levers 35 has a number of gear teeth thereon, and the gear teeth on the ends of the corresponding branches mesh.

The intermediate section of the casing secured to the top of the standard 7 comprises two curved members 38, approximately semi-circular. One of said curved members 38 is located upon each side of the block 34 and the speed changing levers 35; and between the corresponding ends of said curved members 38 is a space equal to the width of the speed changing levers 35. Near each end of each curved member 38 on both the upper and lower edges thereof is a shoulder 39. The corresponding shoulders 39 are spaced apart equal to the width of the outer ends of the dogs 29. On each side of each end of each curved member 38 in both the upper and lower faces thereof is a notch 40 having a width equal to the width of the outer ends of the dogs 29.

Fixed upon the upper end portion of the smallest pipe 9 above the block 34, to which the speed changing levers 35 are pivoted, is a rectangular block 41. Pivoted by bolts 42 to the block 41 near each end thereof are dogs 43 having bifurcated ends. The dogs 43 are the same as the dogs 29 except that they are inverted. Also, like the dogs 29, the branches 44 of the bifurcated ends of the dogs 43 have gear teeth and compression springs 45. Likewise, the gear teeth of the corresponding branches 44 mesh, and the springs 45 tend to move the outer end portions of the dogs 43 downwardly. In the under or lower face of the outer end portion of each dog 43 is a groove $44^a$.

The upper section of the casing secured to the top of the standard 7 comprises a plate 46 which has a downwardly extending flange 47 along its edge. Through the plate 46 passes the shaft 8 which extends some distance above said plate 46 and which has fixed to its upper end portion a steering wheel 48.

Surrounding the shaft 8 and located above the plate 46 is a loose sleeve 49. Secured to the sleeve 49 near its upper end are two arms or handles 50 which extend in opposite directions from said sleeve 49. Surrounding the sleeve 49 and fitting loosely thereon is a second sleeve 51 which is shorter than the sleeve 49. Secured to the second sleeve 51 near the upper end thereof are two arms or handles 52 which also extend in opposite directions from said second sleeve 51. Secured to the sleeve 49 near its lower end is a gear 53, and secured to the second sleeve 51 near its lower end is a gear 54. Projecting upwardly from the plate 46 is a rectangular casing 55 which incloses the gears 53 and 54. Secured to the casing 55 are two spring-pressed pins 56, the ends of which are conical and engage between the teeth of the respective gears 53 and 54. Fixed to a shaft 57, which is journaled near its upper end in the plate 46, is a sector-gear 58 which meshes with the gear 54 fixed to the second sleeve 51. Fixed to a shaft 59, which is journaled near its upper end in the plate 46, is a sector-gear 60 which meshes with the gear 53 secured to the sleeve 49. The shafts 57 and 59 extend vertically and downwardly within projecting pipes 61 through the base plate 6 and terminate a short distance below said base plate. To the lower end portion of each shaft 57 and 59 is fixed an arm 62. To the arms 62 are connected rods (not shown) which lead respectively to the throttle for the carbureter of the motor which drives the vehicle and to the spark control of said motor.

The lower section 12, the lower intermediate section 23, the curved members 38 and the upper section of the casing secured to the top of the standard 7 each have two integral projections or bosses 63 on each one of two opposite sides, in each of which bosses is a circular hole. The circular holes in the corresponding bosses 63 aline, and through them pass long screws 64 which serve to secure the different sections together. The lower section 12 is fastened to the standard 7. Upon the rectangular casing 55 of the upper section is secured a cover plate 65.

In the base plate 6 which supports the standard 7, is a circular opening having an upwardly extending annular flange surrounding it, and mounted to turn in said opening is a hollow shaft 66. The largest pipe 11, together with the pipes 10 and 9 and the shaft 8 mounted therein, passes through the bore of the hollow shaft 66. Below the base plate 6 is a casting 67 which is supported by the channels 1 and 2 and is secured thereto. The casting 67 and the base plate 6 are fastened together by long screws 68 which pass through the downwardly projecting bosses 69 integral with the base plate 6. In the casting 67 are two vertically spaced bearings 70 through which the shaft 8 passes.

Integral with the hollow shaft 66 near its upper end and above the base plate 6 is a bevel-gear 71. On each side of the hollow shaft 66 and the bevel-gear 71 are two spaced bearings 72. In each pair of said bearings 72 is journaled a rock shaft 73. Each rock shaft 73 has an enlargement 74 between its ends which has an opening therein through which one of the pipes 61 passes. The rock shafts 73 can rock through a small angle relative to the pipes 61. To each rock shaft 73 at one end is fixed a sector-bevel-gear 75, and these sector-bevel-gears mesh with the bevel-gear 71 on opposite sides thereof. To each rock shaft 73 near the end opposite the end to which said sector-bevel-gear 75 is fastened, are fastened two pedals 76 which extend from said rock shaft 73 in opposite directions. The pedals 76 extend from the rock shafts 73 at different angles. Consequently, when one pedal 76, secured to one of the rock shafts 73 and extending to one side of said rock shaft 73, is up; the pedal 76 secured to the other rock shaft 73 and extending to the same side of the rock shaft 73, is down, and vice versa.

To the hollow shaft 66 near the lower end thereof is fixed a crank-arm 77. A lever 78 is pivoted near one end thereof upon a screw 79 fastened to the base plate 6 and the casting 67. To the other end of the lever 78 is pivoted one end of a link 80, which is pivotally connected at its other end to the crank arm 77. Between the ends of the lever 78 is pivotally connected one end of an adjustable link 81, and the other end of said adjustable link is pivotally connected to a crank-arm 82 fixed to a rock-shaft 83 which is mounted in bearings 84 secured to the channels 1 and 2. The rock-shaft 84 is suitably connected to the clutch (not shown) which, as in the usual construction of motor vehicles, is located between the motor shaft and the change-speed gearing of the transmission of the motor vehicle.

The largest pipe 11 extends through the hollow shaft 66 for a short distance below the arm 77, and to this projecting portion of the largest pipe 11 is fixed a member comprising a sector-bevel-gear 85 and a sector 86 having three notches 87 therein. The sector-bevel-gear 85 and the notched sector 86 extend in opposite directions from the largest pipe 11. The pipe 10 extends for a short distance below the end of the largest pipe 11 and has fixed thereto a member comprising a sector-bevel-gear 88 and a sector 89 having three notches 90 therein, said sector-bevel-gear 88 and said notched sector 89 extending in opposite directions from said pipe 10. The smallest pipe 9 extends a short distance below the end of the pipe 10 and has fixed thereto a member comprising a sector-bevel-gear 91 and a sector 92 having three notches 93 therein; said sector-bevel-gear 91 and said notched sector 92 extending in opposite directions from the smallest pipe 9. The sector-bevel-gears 85, 88 and 91 are successively smaller in diameter so that their teeth lie in the surface of a cone. The lower member fixed to the smallest pipe 9 rests upon the upper bearing 70 in the casting 67.

The notched sectors 86, 89 and 92 which are secured to the three pipes 11, 10 and 9 respectively, have their outer edges in a vertical plane. The three notches 87, 90 and 93 in the sectors 86, 89 and 92 respectively are spaced the same distance apart in each of said sectors, and in the different operative positions of said sectors said notches aline vertically. Upon the lever 78 is a locking tongue 94 which is adapted to move in and out of the alined notches in the sectors 86, 89 and 92.

Meshing with the sector-bevel-gear 85 is a sector-bevel-gear 95 which is fixed to a hollow shaft 96 near one end thereof. Meshing with the sector-bevel-gear 88 is a sector-bevel-gear 97 fixed to a hollow shaft 98 near one end thereof. Meshing with the sector-bevel-gear 91 is a sector-bevel-gear 99 which is fixed to a shaft 100 near one end thereof. The shafts 96, 98 and 100 are concentric. The shaft 100 is journaled at one end in the bearing 101, preferably formed integral with the casting 67, and at its other end in a bearing 102 fixed to the cross channel 3. To each of the shafts 96, 98 and 100 is fixed an arm 103. The arms 103 are each pivotally connected to a sleeve 106. Extending through each sleeve 106 is a rod 107. The operative connection between the sleeves 106 and their respective rods 107 is the same; and the description of one will suffice for all. About each of the rods 107 are collars 108, through each of which passes a pin 109. Each pin 109 passes through a slot 110 in the rod 107. The collars 108, when the pins 109 therein are in contact with the adjacent ends of the slots 110, are in contact with the ends of the sleeve 106. Spaced from each collar 108 is a second collar 111 which is pinned to the rod 107. Between each collar 108 and the corresponding collar 111 is a compression coil spring 112 surrounding the rod 107. The rods 107 are connected in any suitable way to a reversing gearing and change speed gearing, which usually constitutes part of the transmission mechanism between the clutch and the wheels of a motor vehicle. This reversing gearing and change speed gearing forms no part of the present invention and is not shown. The control for motor vehicles which is shown has been designed for use in connection with a change speed gearing of the clutch type in which there are four speeds forward and four speeds backward.

To the shaft 8, near its lower end, is fixed a bevel-gear 113. Below the bevel-gear 113 is a horizontal shaft 114 upon which are loosely mounted two bevel-gears 115 which mesh with the bevel-gear 113 on opposite sides thereof. Upon the inner face of each bevel-gear 115 are clutch teeth 116. Located between the bevel-gears 115 is a clutch collar 117 which is splined upon the shaft 114 so that it can slide thereon but must turn therewith. The clutch collar 117 is adapted to engage the clutch teeth 116 on either of the bevel-gears 115. Connected to the clutch collar 117 is an arm 118. The arm 118 is fastened to a horizontal shaft 119 near one end thereof, said shaft 119 being located below the shaft 114. Fastened to the horizontal shaft 119 near the other end thereof is an upwardly extending operating arm 120, which passes through a slot 121 in the base plate 6. Near each end of the slot 121 a spring-pressed pin 122 is secured to the base plate 6. The spring-pressed pins 122 have pointed ends which are adapted to engage a recess in the outer face of the operating arm 120, when said arm is at either end of the slot 121. To the horizontal shaft 114 is fixed a gear 123 which meshes with a larger gear 124. The larger gear 124 is fastened to a shaft 125 near one end thereof, said shaft 125 extending parallel to the shaft 114. Near the other end of the shaft 125 is fixed a worm 126. Located above the shaft 125 and extending at right angles thereto is a horizontal shaft 127 to which is fastened a worm-sector 128, meshing with the worm 126. To the horizontal shaft 127 is fixed a downwardly extending arm 129 to which is connected in the usual way a link (not shown) which is connected to the steering wheels of the motor vehicle. The bevel-gears 113 and 115 are inclosed in a casing 130 which is adapted to contain a lubricant. The gears 123 and 124 are also inclosed in a casing 131 for containing a lubricant, which is connected to the channels 1 and 2 by the integral bracket members 132. The worm 126 and the worm-sector 128 are also inclosed in a casing 133 for containing a lubricant, which is supported by the channels 1 and 2.

The control shown and described is designed for use in connection with a motor vehicle driven by a gasolene motor in the usual way. The levers 50, which are integral with the sleeve 49, control the throttle of the carbureter of the motor. These levers 50 project in opposite directions from the sleeve 49 and consequently the operator moves each lever 50 in the same direction whether he is seated in front or in back of the standard 7. The throttle is connected to the arm 62 secured to the lower end portion of the shaft 59, and the shaft 59 is turned when the levers 50 are moved by means of the gear 53 and the sector-gear 60, as is apparent. The levers 52 which are integral with the sleeve 51 control the ignition of the motor. The ignition controlling device is connected to the arm 62 fixed to the lower end portion of the shaft 57, and the shaft 57 is turned when the levers 52 are moved by means of the gear 54 and the sector-gear 58, as is apparent. The spring-pressed pins 56 engage between the teeth of the gears 53 and 54 and serve to retain the throttle lever 50 and the spark lever 52 respectively in the different positions in which they are placed by the operator.

In order to make the operation of the control clear, the manipulations necessary to start the motor vehicle will be described. The reversing lever 16 and the speed changing levers 35 are assumed to be in their neutral positions, that is, the reversing levers 16 are in the notches 21 and the speed changing levers 23 are in the spaces between the ends of the curved members 38. The gasolene motor is started, and the clutch is thrown out of its operative position by depressing the right-hand pedal 76. When the right-hand pedal 76 is depressed, the hollow shaft 66 is partially rotated by the sector-bevel-gear 75 and the bevel-gear 71, and the crank-arm 77 is swung through a small angle. The lever 78, being connected to the crank-arm 77 by the link 80, is also swung, and the rock-shaft 83 is operated by means of the link 81 and the crank-arm 82.

Referring to Fig. 13, the crank-arm 77 is in the position in which the clutch is in its operative position, and said crank arm is swung in a counter-clockwise direction to throw the clutch out of its operative position. When the right-hand pedal 76 is depressed, the crank-arm 77 is swung to the opposite side of the straight line between the axis of said crank-arm and the center of the pivot which connects the link 80 to the lever 78. The spring upon the clutch, which tends to return the clutch to its operative position, will then tend to swing the crank arm 77 farther in a counter-clockwise direction; but since the crank-arm 77 strikes the lever 78, said spring cannot move the crank-arm 77, and the clutch is retained out of its operative position.

When the lever 78 is swung to throw the clutch out of its operative position, the locking tongue 94, integral with said lever, is withdrawn from the notches 87, 90 and 93, in the sectors 86, 89 and 92, which are fastened to the pipes 11, 10 and 9 respectively, and the pipes 11, 10 and 9 are free to move.

Assuming that the operator is facing forward, he unlocks the reversing lever 16 projecting rearwardly from the standard 7 by lifting said reversing lever from the notch 21 in which it is seated. Since the reversing levers 16 are connected by the gear teeth, when one of said reversing levers 16 is lifted from its notch 21, the other reversing lever is also lifted from its notch 21. After the reversing lever 16 has been unlocked the operator swings it to the right or left, depending on the direction he wishes to drive the motor vehicle. The reversing levers 16 swing simultaneously and turn the block 15, which turns the largest pipe 11. The largest pipe 11 rocks the hollow shaft 96 by means of the sector-bevel-gears 85 and 95. When the hollow shaft 96 is turned, the arm 103 connected thereto moves the sleeve 106 along the rod 107 in the direction depending upon the direction in which the hollow shaft 96 turns. The sleeve 106 is moved a distance about equal to the length of the slots 110 in the rod 107, and the spring 112 is compressed. If the parts of the reversing gearing, such as the sliding gears, sliding clutches or the like which engage each other, are in the proper position to engage with each other, the rod 107 is immediately moved by the spring 112 to engage said parts with each other. However, if said parts of the reversing gearing are not in the proper position to engage with each other, the spring 112 is compressed; and when the clutch is thrown into its operative position, and the parts of the reversing gearing moved, the spring 112 will snap said parts into engagement with each other when said parts have been moved to the position where they can engage. After the operator has moved the reversing lever 16, he releases it, and the springs 20 press said reversing levers downwardly between one of the shoulders 22 and the corresponding end of the long notch 27, thus locking them.

The manipulations so far described place the reversing gearing in the position to move the motor vehicle either forward or backward. The next manipulations are those which operate the change speed gearing to secure the desired ratio of speed between the motor shaft and the wheels of the motor vehicle. The control shown and described is designed for controlling four speeds, that is, four different ratios between the motor shaft and the wheels of the motor vehicle. All of the four speeds are controlled by the speed changing levers 35. The neutral positions of the speed changing levers 35 is shown in Fig. 2, in which said speed changing levers are in the spaces between the ends of the curved members 38, and the dogs 29 and 43 are engaged with the shoulders 39. Two of the four speeds are controlled by the smallest pipe 9, and the other two speeds are controlled by the pipe 10.

To obtain the first or lowest speed, the operator lifts the speed changing lever 35 nearest to him from the space between the ends of the curved members 38 into the notch 44ª in the under face of the outer end portion of the corresponding dog 43. The continued upward movement of the speed changing lever 35 rocks this dog 43 until it clears the shoulders 39. Since the dogs 43 are connected by the gear teeth, when the outer end portion of one dog 43 is raised, the outer end portion of the other dog is also raised. Both speed changing levers 35 being thus unlocked, the nearest one is then swung sidewise in the direction desired, which in the present construction for the first speed, is to the left. The dogs 43, the block 41, and the smallest pipe 9 are moved when the speed changing levers 35 are moved. The turning of the smallest pipe 9 turns the hollow shaft 100 by means of the sector-bevel-gears 91 and 99. The shaft 100 is operatively connected to one of the rods 107, the one to which the gearing for the first speed is connected, by means of the arm 103, the sleeve 106 and the spring 112. This rod 107 is operated by the turning of the shaft 100 in the same way as hereinbefore described in connection with the operation of the reversing gearing by the reversing levers 16.

By the manipulations above described, the reversing gearing and the change speed gearing of the transmission mechanism is set so that the motor vehicle will move forward at the first or lowest speed. The left-hand pedal 76 is then depressed, and this releases the locking action between the crank arm 77 and the lever 78. The spring upon the clutch, aided by the pressure upon the left-hand pedal 76, throws the clutch into its operative position and connects the wheels of the motor vehicle to the motor. When the left-hand pedal 76 is depressed, the locking tongue 94 of the lever 78 moves in the notches 87, 90 and 93 in the sectors 86, 89 and 92, and holds the shafts 11, 10 and 9 respectively against turning.

It is desirable that the operator who is facing in the direction in which the motor vehicle is traveling should turn the steering wheel 48 in the same direction whether said motor vehicle is traveling forward or backward. This result is accomplished by providing mechanism for changing the connection between the steering wheel and the steering device of the motor vehicle so as to reverse the relative movement of said steering wheel and said steering device. This mechanism is operated by moving the arm 120 to either end of the slot 121 in the base plate 6. The movement of the arm 120 rocks the shaft 119 and moves the clutch collar 117 from engagement with the clutch teeth upon one of the bevel-gears 115 to the other bevel-gear 115. When the clutch collar 117 is in engagement with one of the bevel-gears 115, the shaft 114 turns in one direction relative to the steering wheel 48, and when the clutch collar 117 is in engagement with the other bevel-gear 115, the shaft 114 turns in the opposite direction relative to said steering wheel. The shaft 114 drives the shaft 125 by means of the gears 123 and 124 and the shaft 125 drives the shaft 127 by means of the worm 126 and the worm-sector 128. Thus, the arm 129 is moved when the shaft 127 is turned and operates the steering devices of the motor vehicle. The spring-pressed pins 122 retain the arm 120 at either end of the slot 121 by engaging in the recess in said arm.

Some motor vehicles, such as tractors used for farming purposes and the like, are driven backward in use as well as forward; and where such a motor vehicle is driven backward for a considerable time, it is difficult for the operator to face forward and control the motor vehicle while it is traveling backward. The control shown and described obviates this objection and permits the operator to face in the direction in which the motor vehicle is traveling, and to operate all of the usual controlling devices, irrespective of whether a motor vehicle is traveling forward or backward. This is made possible in the control shown and described because the controlling devices are all duplicated and arranged so that they can be operated from either the front or the back of the control. Thus, the levers controlling the throttle and ignition of the motor are duplicated, and can be operated from either the front or the back of the control. The reversing levers 16 and the speed changing levers 35 are geared together so that the movements made by the operator in manipulating these levers is the same whether he is seated at the front or the back of the control. The smallest pipe 9 and the pipe 10 which are connected to the change speed gearing of the motor vehicle are locked in their neutral and both of their shifted positions. The largest pipe 11 which is connected to the reversing gearing of the tractor is locked in its neutral and shifted positions, since the reversing levers 16 engage in the notches 21 in the neutral position of the largest pipe 11, and against the shoulders 22 in the shifted positions of said largest pipe. The largest pipe 11 controls both the forward and backward movement of the motor vehicle, and hence the gearing which causes the forward movement and the gearing which causes the backward movement cannot be placed in operation at the same time. The smallest pipe 9 and the pipe 10 control the change speed gearing, and since the smallest pipe 9 and the pipe 10 are operated one at a time by the speed changing levers 35, the gearing for only one speed can be placed in operation at any one time. The pipes 9, 10 and 11 are locked when the clutch is in its operative position, and consequently, the change speed gearing and the reversing gearing cannot be operated while the clutch is in its operative position. The clutch pedals are manipulated by the same movements on the part of the operator whether he is seated in front or in the back of the control. The clutch is held out of its operative position by the locking action of the crank arm 77, the link 80 and the lever 78, as hereinbefore described.

The springs 112 make the connection between the change speed gearing and the speed changing levers 35 resilient. Also, the connection between the reversing gearing and the reversing levers 16 is resilient. This feature is important in certain heavy motor vehicles, such as tractors, because such heavy motor vehicles stop very quickly when the clutch is thrown out of its operative position, and the motor is disconnected from the wheels of the vehicle. In such heavy motor vehicles, the different speeds are for the different kinds of work for which the motor vehicle is used; and each of the different speeds must be engageable while the motor vehicle is at rest.
When the motor vehicle is at rest, it is very liable to happen that the parts of the change speed gearing which engage with each other are not in the proper position to so engage, and often it is necessary to manipulate the clutch several times before such proper position is obtained. In the control shown and described, however, the springs 112 permit the speed changing levers 35 and the reversing levers 16 to be shifted and locked although the parts of the gearing which they control may not be in the position for engagement with each other.

While for the purpose of illustration, I have shown my invention embodied in a control for a tractor, the control embodying my invention may be used for other kinds of motor vehicles. Also, the control shown and described is designed for use in connection with change speed gearing which permits four speeds forward and four speeds backward; but my invention is not limited to this particular number of speeds. It is apparent that other changes may be made in the construction which I have shown and described without departing from my invention, and I do not wish to be limited to the details of the construction shown and described.

What I claim as my invention is:

1. A control for motor vehicles comprising a shaft, a hand wheel secured to said shaft, a second shaft, means for operatively connecting said shafts to turn relatively in one direction, means for operatively connecting said shafts to turn relatively in the opposite direction, and means for selectively operating said means.

2. A control for motor vehicles comprising two shafts connected together to turn in opposite directions, two pedals secured to each of said shafts and projecting therefrom in opposite directions, means for operatively connecting said shafts to a spring engaged clutch of said motor vehicle, said means comprising a device for holding said clutch out of its clutching position against the action of its spring, said device being releasable by the movement of said means in the direction to throw said clutch into its clutching position, and a platform for the operator extending in front of and behind said pedals to enable the operator to use one set of pedals while facing in one direction and the other set of pedals while facing in the opposite direction.

3. A control for motor vehicles comprising a standard, a hollow shaft rotatably mounted in said standard, a second shaft rotatably mounted in said hollow shaft, said shafts being operatively connected to the change speed gearing for changing the ratio of speed of the motor and the speed of the wheels of said motor vehicle, dogs pivotally connected to said hollow shaft and projecting in opposite directions therefrom, other dogs pivotally connected to said second shaft and projecting in opposite directions therefrom, a casing secured to said standard and having notches therein in which said first-mentioned dogs and said last mentioned dogs can engage in the different operative positions of said hollow shaft and said second shaft, two hand levers movably mounted in said casing and projecting therefrom in opposite directions, said hand levers being adapted to engage said dogs one at a time and move said dogs, said hand levers being operatively connected to take corresponding movements, and a platform for the operator extending in front of and behind said hand levers to enable the operator to use one set of hand levers while facing in one direction and the other set of hand levers while facing in the opposite direction.

4. A control for motor vehicles comprising a shaft operatively connected to the reversing gearing of the motor vehicle for reversing the direction of movement of said motor vehicle, two hand levers pivoted to said shaft and extending therefrom in opposite directions, a member having notches therein, said hand levers being adapted to engage one of said notches in the neutral and operative positions of said hand levers, means for connecting said hand levers to constrain said hand levers to move upwardly or downwardly simultaneously, and a platform for the operator extending in front of and behind said hand levers to enable the operator to use one set of hand levers while facing in one direction and the other set of hand levers while facing in the opposite direction.

5. A control for motor vehicles comprising a standard, levers projecting from said standard in opposite directions for controlling the change-speed gearing of the motor vehicle, a steering shaft mounted in said standard, a second shaft operatively connected to the steering wheels of the motor vehicle, means for operatively connecting said steering shaft and said second shaft to turn relatively in one direction, means for operatively connecting said steering shaft and said shaft to turn relatively in the opposite direction, means for selectively setting said means into operation, and a platform for the operator extending far enough around said standard to enable the operator to use one set of levers while facing in one direction and the other set of levers while facing in the opposite direction.

6. A control for motor vehicles comprising a standard, a steering shaft rotatably mounted in said standard, a bevel gear secured to said shaft, two bevel gears mounted to turn on a second shaft located below said first shaft and meshing with said bevel gear on opposite sides thereof, means for connecting either one or the other of said last-mentioned bevel gears to said second shaft, means connecting said second shaft to the steering wheels of said motor vehicle, a platform extending in front of and behind said standard and separate means for manipulating said steering shaft, one of said means being within reach of the operator while facing in one direction and the other means being accessible to the operator while facing in the opposite direction.

7. A control for motor vehicles comprising a standard, two shafts rotatably mounted in said standard, two oppositely arranged handles for operating either of said shafts, means for connecting each of said shafts to the change speed gearing which changes the ratio of the speed of the motor relative to the wheels of said motor vehicle, said means being resiliently yieldable, a third shaft mounted in said standard, two oppositely arranged operating handles for said third shaft, means for connecting said third shaft to the reversing gearing which reverses the direction of movement of said motor vehicle, said last-mentioned means being resiliently yieldable, a platform for the operator extending in front of and behind said standard and said handles for manipulating said change speed gearing and said reversing gearing, one of each of said pairs of handles being accessible to the operator while facing forward and the other of each of said pairs of handles being accessible to the operator while facing backward.

8. A control for motor vehicles comprising a standard, a tubular shaft mounted in said standard, levers projecting from said shaft in opposite directions and operatively connected to said shaft, means for locking said levers in their different operative positions, a steering shaft mounted in said tubular shaft, a second shaft operatively connecting said steering shaft and second shaft, means for controlling said gearing, a clutch shaft mounted adjacent to said standard, pedals secured to said clutch shaft and projecting therefrom in opposite directions, and a platform for the operator extending in front of and behind said standard, whereby he may have access to one set of levers and pedals while facing in one direction, and access to the other set of levers and pedals while facing in the opposite direction.

9. A control for motor vehicles comprising means for controlling the reversing gearing which reverses the direction of movement of said motor vehicle, said means being normally held against movement in its operative and inoperative positions, said means being releasable and operable by the same movements on the part of an operator whether said operator faces forward or backward of said motor vehicle, other means for controlling the change speed gearing which changes the ratio of the speed of the motor to the speed of the wheels of said motor vehicle, said last mentioned means being normally held against movement in its operative and inoperative positions, said last mentioned means being releasable and operable by the same movements on the part of an operator whether said operator faces forward or backward of said motor vehicle, and a platform for the operator extending far enough around the parts to be manipulated to enable the operator to reverse his position and still have access to both sets of devices to be manipulated.

10. A control for motor vehicles comprising a standard, a shaft rotatably mounted in said standard, a second shaft rotatably mounted in said standard, two hand levers movably mounted in said standard and extending therefrom in opposite directions, dogs operatively connected to said first shaft, other dogs operatively connected to said second shaft, said first-mentioned dogs and said last-mentioned dogs being adapted to be engaged one at a time by said hand levers to move therewith, means for locking said dogs in the different operative positions of said shafts, means for constraining said hand levers to move simultaneously in the direction to release the dogs, and a platform for the operator extending in front of and behind said hand levers to enable the operator to use one set of hand levers while facing in one direction and the other set of hand levers while facing in the opposite direction.

11. A control for motor vehicles comprising a shaft operatively connected to the clutch of said motor vehicle, pedals extending in opposite directions from said shaft and adapted to operate it in the same direction when depressed, shafts operatively connected to the change speed gearing and the reversing gearing of said motor vehicle, and means operatively connected to said first-mentioned shaft for locking said last-mentioned shafts in their different operative positions, when said clutch shaft is in its engaging position.

12. A control for motor vehicles comprising two shafts arranged in a line and connected together to turn in opposite directions, a pedal secured to each of said shafts, said pedals projecting in opposite directions from the line of said shafts, and a platform for the operator extending in front of and behind said pedals, whereby the operator can actuate one of said pedals while facing in one direction and the other pedal while facing in the opposite direction.

13. A control device for motor vehicles comprising a shaft, levers projecting from said shaft in opposite directions and operatively connected to said shaft to rotate it, each in the opposite direction, and means for locking said levers in their several positions.

14. A control for motor vehicles comprising a standard, a shaft mounted in said standard, two levers connected to said shaft for turning said shaft, said levers having a limited amount of vertical movement, and a member having notches in its upper edge arranged to be engaged by said lever in their different operative positions, said levers being connected together to move upwardly and downwardly simultaneously.

15. The combination with a motor vehicle adapted to travel either forward or backward, of a control device for said motor vehicle comprising a standard, two shafts mounted in said standard, two levers projecting from said standard in opposite directions, and means for connecting said levers simultaneously to said shafts selectively.

16. A control for motor vehicles comprising means for controlling the change speed gearing which changes the ratio of the speed of the motor to the speed of the wheels of said motor vehicle, said means being normally held against movement in its operative and inoperative positions, said means being releasable and operable by the same movement on the part of an operator relative to his position whether said operator faces forward or backward of said motor vehicle.

17. A control for motor vehicles comprising a standard, means mounted on said standard for controlling the speed changing gearing which changes the ratio of the speed of the motor relative to the wheels of said motor vehicle, two shafts connected together to turn in opposite directions, two pedals secured to each shaft and projecting in opposite directions therefrom, means for operatively connecting said shafts to the clutch of said motor vehicle, means operated by said last-mentioned means for locking said first-mentioned means against movement in any of its operative or inoperative positions, and a platform for the operator extending far enough around said standard to enable the operator to use one set of pedals while facing in one direction and the other set of pedals while facing in the opposite direction.

Signed at St. Louis, Missouri, this 6th day of October, 1914.

WILLIAM C. ZELLE.

Witnesses:
NEIL D. PRESTON,
MARTHA A. SHELTON.